United States Patent
Cahill et al.

(10) Patent No.: US 10,415,587 B2
(45) Date of Patent: Sep. 17, 2019

(54) COMPOSITE FAN AND METHOD OF MANUFACTURE

(71) Applicant: Horton, Inc., Roseville, MN (US)

(72) Inventors: Kevin Cahill, Fishers, IN (US); Eric Strauss, Fishers, IN (US); Doug Burchett, Camby, IN (US); Charles Mark Shogren, Sheridan, IN (US)

(73) Assignee: Horton, Inc., Roseville, MN (US)

( * ) Notice: Subject to any disclaimer, the term of this patent is extended or adjusted under 35 U.S.C. 154(b) by 0 days.

(21) Appl. No.: 15/294,176

(22) Filed: Oct. 14, 2016

(65) Prior Publication Data

US 2017/0030367 A1 Feb. 2, 2017

Related U.S. Application Data (63) Continuation of application No. PCT/US2015/028733, filed on May 1, 2015.

(60) Provisional application No. 61/988,582, filed on May 5, 2014.

(51) Int. Cl.
| | | |
|---|---|---|
| *F04D 29/38* | (2006.01) | |
| *F04D 29/34* | (2006.01) | |
| *F04D 29/32* | (2006.01) | |
| *F04D 29/02* | (2006.01) | |
| *F04D 29/64* | (2006.01) | |

(52) U.S. Cl.
CPC .......... *F04D 29/34* (2013.01); *F04D 29/023* (2013.01); *F04D 29/329* (2013.01); *F04D 29/384* (2013.01); *F04D 29/388* (2013.01); *F04D 29/646* (2013.01); *F05D 2260/941* (2013.01); *F05D 2300/603* (2013.01); *F05D 2300/61* (2013.01)

(58) Field of Classification Search
CPC ................................ F04D 29/384; F04D 29/34
See application file for complete search history.

(56) References Cited

U.S. PATENT DOCUMENTS

| | | |
|---|---|---|
| 1,255,346 A | 2/1918 | Sparks |
| 1,712,883 A | 5/1929 | Groner |
| 2,251,887 A | 8/1941 | Larsh |
| 2,368,656 A | 2/1945 | Gaskell et al. |
| 2,396,232 A * | 3/1946 | Chilton ............. F04D 29/34 123/41.65 |

(Continued)

FOREIGN PATENT DOCUMENTS

| | | |
|---|---|---|
| CN | 1330230 A | 1/2002 |
| CN | 102003217 A | 4/2011 |

(Continued)

OTHER PUBLICATIONS

US 8,251,661 B2, 08/2012, Kilian et al. (withdrawn)

(Continued)

*Primary Examiner* — Christopher Verdier
*Assistant Examiner* — Michael L Sehn
(74) *Attorney, Agent, or Firm* — Westman, Champlin & Koehler, P.A.

(57) ABSTRACT

A method of making a modular fan includes positioning a mounting pad of a blade between two plates of a center hub assembly, aligning the blade such that the mounting pad is located radially inward of an outer edge of at least one of the two plates, and spacing the outer edge of the at least one of the two plates from the blade at the outer edge.

26 Claims, 7 Drawing Sheets

(56) References Cited

U.S. PATENT DOCUMENTS

| | | |
|---|---|---|
| 2,559,831 A | 7/1951 | Roffy |
| 2,581,873 A | 1/1952 | Morrison |
| 3,036,642 A | 5/1962 | Twist |
| 3,321,019 A | 5/1967 | Dmitroff et al. |
| 3,452,820 A | 7/1969 | Philipsen et al. |
| 3,647,317 A | 3/1972 | Furlong et al. |
| 3,751,181 A | 8/1973 | Hayashi |
| 3,892,612 A | 7/1975 | Carlson et al. |
| 4,046,488 A | 9/1977 | Wickham |
| 4,098,559 A | 7/1978 | Price |
| 4,134,567 A | 1/1979 | Kurscheid |
| 4,180,413 A | 12/1979 | Diederich |
| 4,251,309 A | 2/1981 | Class et al. |
| 4,257,738 A * | 3/1981 | Schwarz ............... B64C 27/32 416/134 A |
| 4,260,327 A | 4/1981 | Armor et al. |
| 4,268,468 A | 5/1981 | Esper et al. |
| 4,302,155 A | 11/1981 | Grimes et al. |
| 4,316,701 A | 2/1982 | Scarpati et al. |
| 4,339,230 A * | 7/1982 | Hill ..................... B64C 27/473 416/226 |
| 4,345,877 A | 8/1982 | Monroe |
| 4,352,632 A | 10/1982 | Schwarz et al. |
| 4,362,588 A | 12/1982 | Anton et al. |
| 4,420,354 A | 12/1983 | Gougeon et al. |
| 4,605,355 A | 8/1986 | Davis et al. |
| 4,606,702 A | 8/1986 | Dinger |
| 4,621,980 A | 11/1986 | Reavely et al. |
| 4,639,284 A | 1/1987 | Mouille et al. |
| 4,671,739 A | 6/1987 | Read et al. |
| 4,685,864 A | 8/1987 | Angus et al. |
| 4,714,409 A | 12/1987 | Denison et al. |
| 4,746,271 A | 5/1988 | Wright |
| 4,892,462 A | 1/1990 | Barbier et al. |
| 4,930,987 A | 6/1990 | Stahl |
| 4,936,751 A | 6/1990 | Marshall |
| 4,957,414 A | 9/1990 | Willingham |
| 4,966,527 A | 10/1990 | Merz |
| 4,976,587 A | 12/1990 | Johnston et al. |
| 4,990,205 A * | 2/1991 | Barbier ............... B29D 99/0025 156/242 |
| 5,080,851 A | 1/1992 | Flonc et al. |
| 5,096,384 A * | 3/1992 | Immell ................ B29C 70/345 156/172 |
| 5,123,814 A | 6/1992 | Burdick et al. |
| 5,129,787 A | 7/1992 | Violette et al. |
| 5,230,850 A | 7/1993 | Lewis |
| 5,269,658 A | 12/1993 | Carlson et al. |
| 5,273,819 A | 12/1993 | Jex |
| 5,314,309 A * | 5/1994 | Blakeley ............... B29C 70/081 264/135 |
| 5,378,109 A | 1/1995 | Lallo et al. |
| 5,392,514 A | 2/1995 | Cook et al. |
| 5,454,693 A | 10/1995 | Aubry et al. |
| 5,462,409 A | 10/1995 | Frengley et al. |
| 5,567,116 A | 10/1996 | Bourcier |
| 5,632,601 A | 5/1997 | Bodmer et al. |
| 5,634,771 A | 6/1997 | Howard et al. |
| 5,667,881 A | 9/1997 | Rasmussen et al. |
| 5,672,417 A | 9/1997 | Champenois et al. |
| 5,683,636 A | 11/1997 | van der Spek et al. |
| 5,691,391 A | 11/1997 | Chen et al. |
| 5,722,814 A | 3/1998 | Yu |
| 5,791,879 A | 8/1998 | Fitzgerald et al. |
| 5,843,354 A | 12/1998 | Evans et al. |
| 5,855,709 A | 1/1999 | Bocoviz et al. |
| 5,873,701 A | 2/1999 | Shiu |
| 5,881,972 A | 3/1999 | Smith et al. |
| 5,908,528 A | 6/1999 | Walla et al. |
| 6,010,306 A | 1/2000 | Bucher et al. |
| 6,010,308 A | 1/2000 | Youn |
| 6,017,484 A | 1/2000 | Hale |
| 6,027,310 A | 2/2000 | Kerr et al. |
| 6,033,185 A | 3/2000 | Lammas et al. |
| 6,048,488 A | 4/2000 | Fink et al. |
| 6,139,277 A * | 10/2000 | Lopatinsky ........... F01D 5/3015 416/220 A |
| 6,171,059 B1 | 1/2001 | Bucher et al. |
| 6,183,202 B1 | 2/2001 | Ganshaw |
| 6,210,117 B1 | 4/2001 | Bucher et al. |
| 6,305,905 B1 | 10/2001 | Nagle et al. |
| 6,309,183 B1 | 10/2001 | Bucher et al. |
| 6,336,792 B1 | 1/2002 | Bucher et al. |
| 6,378,322 B1 | 4/2002 | Calvert |
| 6,431,834 B1 | 8/2002 | Lackey et al. |
| 6,443,701 B1 | 9/2002 | Muhlbauer |
| 6,447,880 B1 | 9/2002 | Coppens |
| 6,454,527 B2 | 9/2002 | Nishiyama et al. |
| 6,481,233 B1 | 11/2002 | Calvert |
| 6,669,447 B2 | 12/2003 | Norris et al. |
| 6,676,376 B2 | 1/2004 | Kerr, Jr. |
| 6,692,231 B1 | 2/2004 | Calvert |
| 6,715,992 B2 | 4/2004 | Rinke |
| 6,723,272 B2 | 4/2004 | Montague et al. |
| 6,800,956 B2 | 10/2004 | Bartlett |
| 6,802,694 B2 | 10/2004 | Bucher et al. |
| 6,821,091 B2 | 11/2004 | Lee |
| 6,844,040 B2 | 1/2005 | Pabedinskas et al. |
| 6,884,507 B2 | 4/2005 | Lin et al. |
| 6,890,155 B2 | 5/2005 | Cartwright |
| 7,112,044 B2 | 9/2006 | Whitehead et al. |
| 7,198,471 B2 | 4/2007 | Gunneskov |
| 7,281,899 B1 | 10/2007 | Bucher et al. |
| 7,311,500 B2 | 12/2007 | Rongong et al. |
| 7,331,764 B1 | 2/2008 | Reynolds et al. |
| 7,351,040 B2 | 4/2008 | Livingston et al. |
| 7,429,420 B2 | 9/2008 | Wiese et al. |
| 7,456,541 B2 | 11/2008 | Horng et al. |
| 7,474,032 B2 | 1/2009 | Horng et al. |
| 7,547,194 B2 | 6/2009 | Schilling |
| 7,594,325 B2 | 9/2009 | Read |
| 7,594,799 B2 | 9/2009 | Miller et al. |
| 7,674,305 B2 | 3/2010 | Lillquist |
| 7,766,622 B1 | 8/2010 | Bucher et al. |
| 7,775,771 B2 | 8/2010 | Wang |
| 7,802,968 B2 | 9/2010 | Jacobsen |
| 7,922,456 B2 | 4/2011 | McMillan |
| 7,927,076 B1 | 4/2011 | Bucher et al. |
| 7,938,627 B2 | 5/2011 | Muller |
| 8,025,484 B2 | 9/2011 | Sun |
| 8,038,408 B2 | 10/2011 | McMillan |
| 8,043,067 B2 | 10/2011 | Kuroiwa et al. |
| 8,047,798 B2 | 11/2011 | Bech |
| 8,070,447 B2 | 12/2011 | Itou et al. |
| 8,109,734 B2 | 2/2012 | Beckhouse |
| 8,162,603 B2 | 4/2012 | Schilling |
| 8,181,902 B2 | 5/2012 | Schlunke |
| 8,182,213 B2 | 5/2012 | Cheung |
| 8,251,664 B2 | 8/2012 | Schreiber |
| 8,323,062 B2 | 12/2012 | Bannasch et al. |
| 8,333,565 B2 | 12/2012 | McMillan |
| 8,337,157 B2 | 12/2012 | Kilian et al. |
| 8,337,163 B2 | 12/2012 | Niles |
| 8,348,604 B2 | 1/2013 | Henkle et al. |
| 8,382,440 B2 | 1/2013 | Baker et al. |
| 8,408,876 B2 | 4/2013 | Bucher et al. |
| 8,415,007 B2 | 4/2013 | Honma et al. |
| 8,419,374 B2 | 4/2013 | Huth et al. |
| 8,475,133 B2 | 7/2013 | Baker et al. |
| 8,480,370 B2 | 7/2013 | Baker et al. |
| 8,500,409 B2 | 8/2013 | Baker et al. |
| 8,506,258 B2 | 8/2013 | Baker et al. |
| 8,551,381 B2 | 10/2013 | Kaps et al. |
| 8,647,070 B2 | 2/2014 | Jevons |
| 8,657,581 B2 | 2/2014 | Pilpel et al. |
| 8,715,556 B2 | 5/2014 | Murakami et al. |
| 8,753,733 B2 | 6/2014 | Pilpel |
| 8,926,288 B2 | 1/2015 | Kuntze-Fechner et al. |
| 2003/0231960 A1 | 12/2003 | Asada et al. |
| 2004/0213674 A1 | 10/2004 | Chen |
| 2005/0042434 A1 | 2/2005 | Kishbaugh et al. |
| 2005/0084377 A1 | 4/2005 | Dambrine et al. |
| 2007/0092379 A1 | 4/2007 | Coupe et al. |

(56) References Cited

U.S. PATENT DOCUMENTS

| | | |
|---|---|---|
| 2007/0231128 A1 | 10/2007 | Callas |
| 2007/0253819 A1 | 11/2007 | Doorenspleet et al. |
| 2008/0009403 A1 | 1/2008 | Hofmann et al. |
| 2008/0050238 A1 | 2/2008 | Durocher et al. |
| 2008/0202060 A1 | 4/2008 | Pilpel et al. |
| 2008/0193709 A1 | 8/2008 | Han |
| 2009/0035144 A1 | 2/2009 | Wang |
| 2009/0085417 A1 | 4/2009 | Vasilescu |
| 2009/0246446 A1* | 10/2009 | Backhouse ............ F01D 5/147 428/76 |
| 2009/0311462 A1 | 12/2009 | Goering |
| 2010/0104847 A1 | 4/2010 | Ciavatta et al. |
| 2011/0049297 A1 | 3/2011 | Jevons et al. |
| 2011/0052405 A1 | 3/2011 | Parkin |
| 2011/0058948 A1 | 3/2011 | Jacob et al. |
| 2011/0150661 A1 | 6/2011 | Robbins |
| 2011/0158813 A1 | 6/2011 | Bucher et al. |
| 2011/0182743 A1 | 7/2011 | Naik |
| 2012/0034085 A1 | 2/2012 | Lagman et al. |
| 2012/0135198 A1 | 5/2012 | Strother |
| 2012/0156049 A1 | 6/2012 | Hong |
| 2012/0163981 A1 | 6/2012 | Hong |
| 2012/0183408 A1 | 7/2012 | Noerlem |
| 2012/0263913 A1 | 10/2012 | Karem |
| 2012/0279641 A1 | 11/2012 | Ball et al. |
| 2012/0321467 A1 | 12/2012 | He |
| 2013/0037986 A1 | 2/2013 | Graf |
| 2013/0048206 A1 | 2/2013 | Henkle et al. |
| 2013/0071234 A1 | 3/2013 | Dimelow |
| 2013/0095282 A1 | 4/2013 | Taketa et al. |
| 2013/0189109 A1 | 7/2013 | Noble |
| 2013/0225020 A1 | 8/2013 | Flood et al. |
| 2013/0317161 A1 | 11/2013 | Konagai et al. |
| 2013/0330496 A1 | 12/2013 | Kray et al. |
| 2014/0023512 A1 | 1/2014 | Pilpel et al. |
| 2014/0080376 A1 | 3/2014 | Jalowka |
| 2015/0003997 A1 | 1/2015 | Mironets et al. |

FOREIGN PATENT DOCUMENTS

| | | |
|---|---|---|
| CN | 202117986 U | 1/2012 |
| CN | 103013055 A | 4/2013 |
| DE | 4125436 C1 | 2/1993 |
| EP | 0159169 A2 | 10/1985 |
| EP | 0212724 A2 | 3/1987 |
| EP | 0396456 A1 | 11/1990 |
| EP | 0627293 A1 | 7/1994 |
| EP | 0657646 A1 | 6/1995 |
| EP | 0637510 A1 | 8/1995 |
| EP | 0353672 B1 | 12/1995 |
| EP | 0604298 B1 | 1/1997 |
| EP | 1077225 B1 | 4/2003 |
| EP | 1704990 A1 | 9/2006 |
| EP | 1485611 B1 | 5/2010 |
| EP | 2547511 A1 | 1/2013 |
| EP | 2677170 A1 | 12/2013 |
| GB | 625155 | 6/1949 |
| GB | 775816 | 5/1957 |
| GB | 1170592 | 11/1959 |
| GB | 1260484 | 1/1972 |
| GB | 1291562 | 10/1972 |
| GB | 1319235 | 6/1973 |
| GB | 1527623 | 10/1978 |
| GB | 2418460 A | 3/2006 |
| JP | S58165501 A | 9/1983 |
| JP | 62-125 U | 1/1987 |
| JP | 62073915 A | 4/1987 |
| JP | 62-150598 U | 9/1987 |
| JP | H04209901 A | 7/1992 |
| JP | 2002005086 A | 1/2002 |
| JP | 2013018228 A | 1/2013 |
| JP | 2014238083 A | 12/2014 |
| KR | 1135025 B1 | 4/2012 |
| WO | WO9506821 A1 | 3/1995 |
| WO | WO9902766 A1 | 1/1999 |
| WO | WO03051559 A1 | 6/2003 |
| WO | WO2010061195 A1 | 6/2010 |
| WO | WO2012008452 A1 | 1/2012 |
| WO | WO2013053666 A1 | 4/2013 |
| WO | WO2013053667 A1 | 4/2013 |
| WO | WO2013141939 A2 | 9/2013 |

OTHER PUBLICATIONS

International Search Report and Written Opinion from PCT Application Serial No. PCT/US2015/028733, dated Aug. 11, 2015, 20 pages.

Extended European Search Report issued in corresponding European patent application No. EP15788951, dated Nov. 17, 2017.

Extended European Search Report issued in corresponding European patent application No. EP17177019, dated Nov. 17, 2017.

European Office Action dated Oct. 8, 2018, in corresponding patent application No. 17177019.1.

Chinese Office Action dated May 15, 2018, in corresponding patent application No. 201580022746.5.

Japanese Office Action dated Mar. 28, 2019, in corresponding patent application No. 2016-565664.

* cited by examiner

COMPOSITE FAN AND METHOD OF MANUFACTURE

CROSS-REFERENCE TO RELATED APPLICATION(S)

This application claims priority to PCT Application No. PCT/US2015/028733, filed on May 1, 2015, and to U.S. Provisional Application No. 61/988,582, filed on May 5, 2014, the disclosures of which are incorporated by reference in their entireties.

BACKGROUND

The present invention relates to composite fan blades and fans utilizing such blades, as well as associated manufacturing methods.

Fans are used in a variety of applications, such as for automotive and vocational (e.g., agricultural, industrial) applications. Such fans can be engaged with a suitable clutch that governs fan operation, allowing selective control of fan rotational speed and associated airflow output.

Prior art fans are often made of molded materials. However, one-piece fan designs present limitations with respect to scalability of a given design. For each size fan offered, new molds/dies and tooling must be developed, which is burdensome and expensive. Modular fans are also known, which utilize individual blades attached to a common hub structure. When the individual blades are made from composite materials, numerous limitations arise with respect to maintaining sufficient strength and durability for rigorous long-term use. Techniques for making composite blades, such as the use of continuous fiber reinforcement (e.g., woven fiber reinforcement preforms), are known. But many such prior art configurations require complex manufacturing methods, which are in turn less scalable than desired (e.g., continuous fiber preforms must be designed and provided for each blade size).

Therefore, it is desired to provide an alternative fan that provides substantial design flexibility while maintaining ease of manufacturability and providing adequate strength and durability.

SUMMARY

In one aspect, a modular fan assembly according to the present invention includes a center hub assembly and a first blade attached to the center hub assembly. The center hub assembly includes a first plate having an outer edge, and a second plate having an outer edge. The first blade has a mounting pad and a working portion. The mounting pad is positioned in between the first plate and the second plate. The working portion extends beyond the outer edges of the first and second plates of the center hub assembly. A thickness of the first blade is smaller proximate the outer edge of the first plate than at the mounting pad to create a first gap between the first blade and the first plate at the outer edge of the first plate.

In another aspect of the present invention, a composite blade for an axial flow fan includes a tip, a root end opposite the tip, a mounting pad located adjacent to the root end, a working portion adjoining the tip, a transition zone between the mounting pad and the working portion, and a reinforcement skin. A blade length is defined between the root end and the tip, and the working portion defines an aerodynamic profile. The reinforcement skin is localized about the root end along the blade length, and extends through the mounting pad and the transition zone and into the working portion.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

In general, the present invention relates to modular fan blades that can be made of composite material. A fan blade of the present invention can have a thickness profile that provides improved structural and stress-relief qualities over prior art composite fan blades. In addition, or in the alternative, the fan blade of the present invention can have a reinforcement pattern that provides improved strength and durability with little or no weight and thickness penalty. The invention further includes a modular fan incorporating the inventive blade design, and an associated method of manufacture. In this way, the fan has a modular construction that permits characteristics such as the number of blades, the size of blades, and/or the airfoil working area geometry of the blades to be relatively easily modified and adjusted without the need for extensive redesign efforts, retooling of manufacturing facilities, etc. The same or similar manufacturing methods and equipment can thus be used to produce a relatively large assortment of fans suitable for a variety of types of applications and capable of delivering a variety of fluid flow performance profiles. Numerous benefits and advantages of the present invention will be appreciated by those skilled in the art in view of the entirety of the present disclosure, including the accompanying figures. The present application claims priority to U.S. Provisional Patent Application Ser. No. 61/988,582, filed May 5, 2014, which is hereby incorporated by reference in its entirety.

Figure 1:
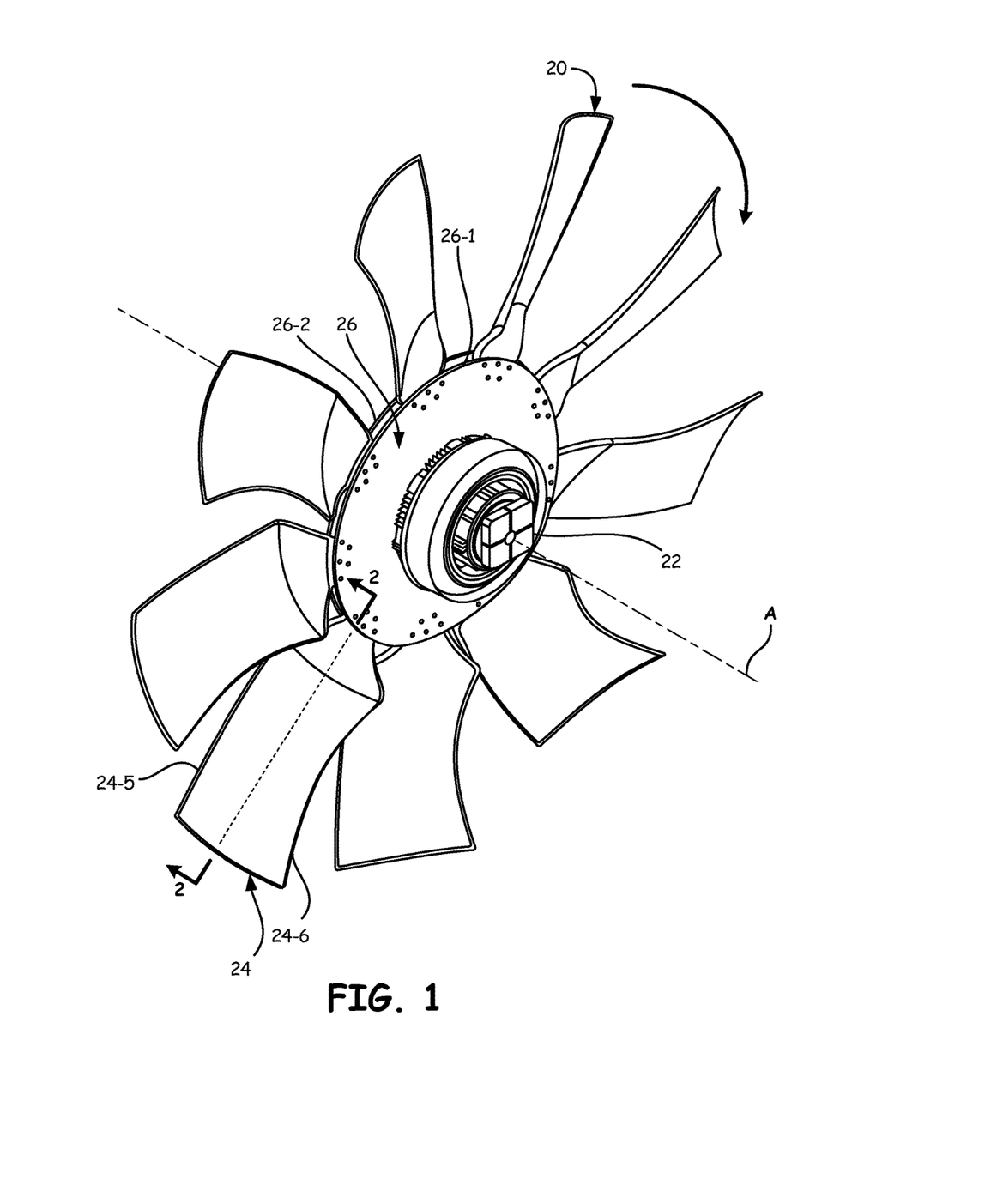
FIG. 1 is a perspective view of an embodiment of a modular fan according to the present invention, shown attached to a fan clutch.
Figure 2A:
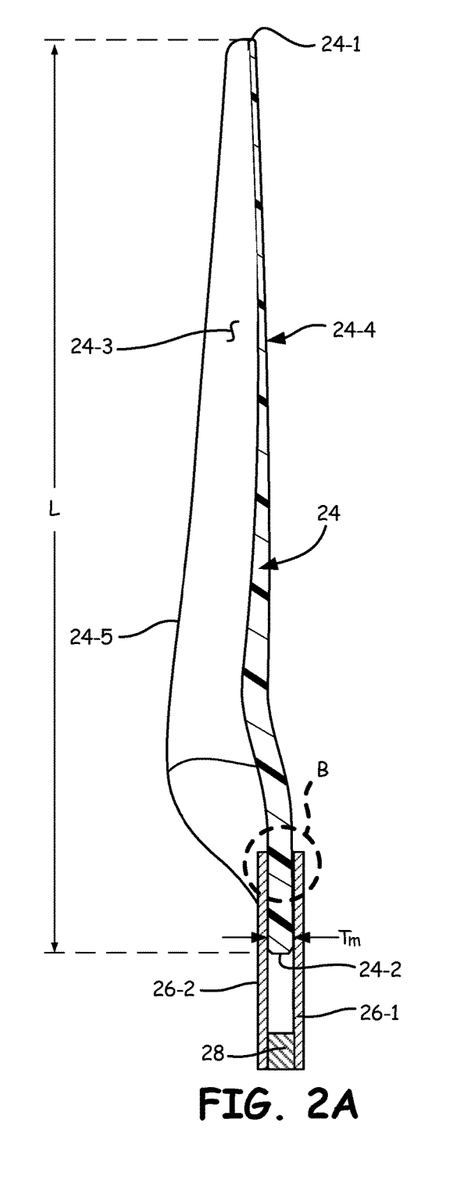
FIG. 2A is a cross-sectional view of a portion of the modular fan, taken along line 2-2 of FIG. 1.
Figure 2B:
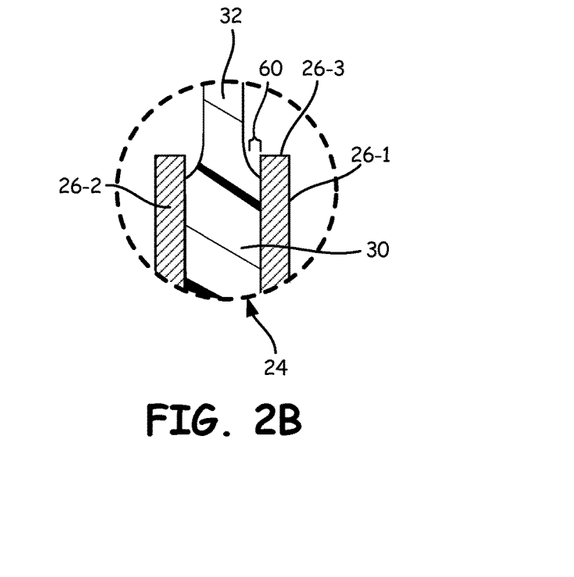
FIG. 2B is an enlarged view of region B of the section of FIG. 2A.

FIG. 1 is a perspective view of an embodiment of a fan 20 according to the present invention, shown attached to a fan clutch 22. FIG. 2A is a cross-sectional view of a portion of the fan 20, taken along line 2-2 of FIG. 1 (i.e., in a radial section plane that when projected passes through the axis A), and FIG. 2B is an enlarged view of region B of the section of FIG. 2A. The fan 20 of the illustrated embodiment is modular in design, with multiple (e.g., three to fifteen) individual blades 24 secured to a center hub (or disc) assembly 26. The fan 20 can be configured to rotate about an axis A to provide axial fluid flow, which is to say that the fan 20 can generally be considered an axial flow fan, even if a discharge flow pattern may be slightly conical in some embodiments. The number of blades 24 and blade solidity of the fan 20 are depicted in FIG. 1 merely by way of example, and not limitation, and in further embodiments can vary as desired for particular applications.

The blades 24 can be made individually, and can be individually secured to the center hub assembly 26. Each blade 24 has a tip 24-1 and an opposite root (or heel) end 24-2, a pressure side 24-3 and an opposite suction side 24-4, and a leading edge 24-5 and an opposite trailing edge 24-6. A length L of the blade 24 is defined in a radial (or spanwise) direction between the tip 24-1 and the root end 24-2. The blade also has a thickness that can vary, with a maximum thickness $T_M$ (over the spanwise blade length L). The blades 24 can be made of fiber-reinforced composite material, as discussed further below. Bolts, rivets or other suitable fasteners can be used to attach the blades 24 to the center hub assembly 26. In alternate embodiments, a mechanical retention or interlock feature such as a dovetail can be provided to retain or help retain the blades. Each of the blades 24 can have an identical or substantially identical configuration. That is, a single blade design can be used to make all of the blades 24 of the fan 20. The single blade design can be utilized to make other fans (not shown) having different numbers of blades, different center hub assemblies, or other modifications suited to particular applications. In this way a fan designer can utilize the single blade design to provide multiple different fan configurations, thereby providing modularity and design flexibility. Individual fan blades 24 can also be trimmed for length, such as by material removal from a blade tip, thereby allowing a single blade design to be used with fans having a variety of different fan diameters. For example, blade trimming can facilitate fan diameter variations of up to approximately 33%. Additional variations in fan diameters are possible through the provision of a number of different blade designs at different lengths, each further trimmable from a nominal starting length. Further details of embodiments of individual blades according to the present invention are discussed below.

The center hub assembly 26 can include a number of at least partially planar discs that are used to "sandwich" and secure the blades 24, such as using suitable fasteners (e.g., bolts, rivets). The illustrated assembly 26 includes a first plate 26-1 and a second plate 26-2 (see, e.g., FIG. 2A), each of which is planar and has a circular perimeter. In further embodiments the plates 26-1 and/or 26-2 can have more complex, three-dimensional shapes. Moreover, in some embodiments multiple plates can be stacked together on one or both sides of the blades 24. For instance, for larger fan sizes, multiple identical plates can be stacked together on both sides of the blades 24 to form the center hub assembly 26. The first and second plates 26-1 and 26-2 can each be made of a metallic material, such as steel. As explained further below, some or all of the blades 24 have portions positioned in between the first and second plates 26-1 and 26-2, with remaining portions of those blades 24 protruding outward from the center hub assembly 26. A central opening can be provided in each plate 26-1 and 26-2 to facilitate attachment of the fan 20 to the clutch 22 or other desired mounting location. Suitable fastener openings can be provided in each of the plates 26-1 and 26-2 for attachments of the blades 24 to the center hub assembly 26, as well as to attach the center hub assembly 26 to the clutch 22 or another structure. In further embodiments, one of the plates 26-1 and 26-2 can be integrated into the clutch 22.

A spacer 28 (or other suitable insert or plug) can be provided at the center hole of the center hub assembly 26 or otherwise at or near an inner diameter of the assembly 26, positioned in between the first and second plates 26-1 and 26-2. In embodiments in which the blades 24 are attached to the center hub assembly 26 at or near outer diameter portions of the first and second plates 26-1 and 26-2, the spacer 28 can help provide rigidity when mounting the fan 20 to the clutch 22 (or other structure). In alternate embodiments, the spacer 28 can be omitted, such as when suitable mounting structures are present on the clutch 22 to obviate the need for the spacer 28.

Figure 3A:
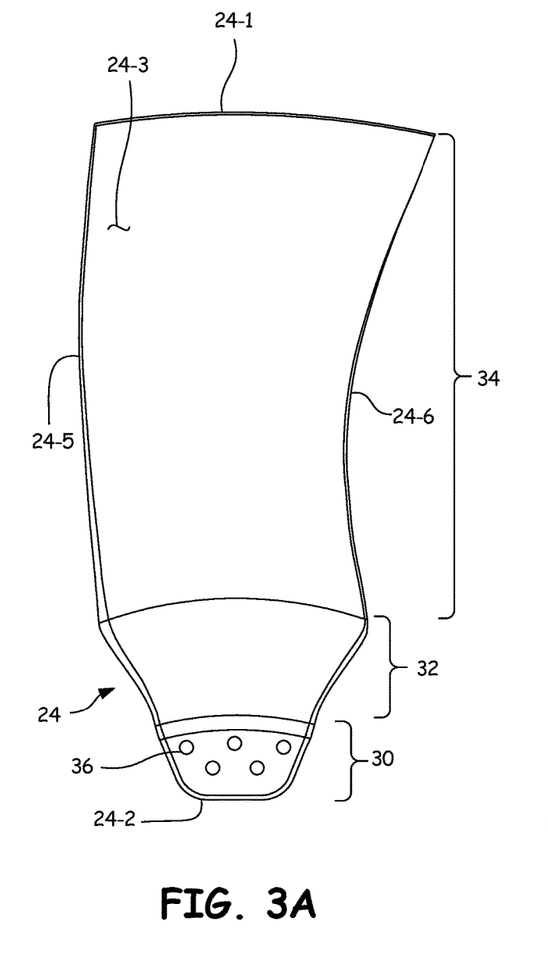
FIG. 3A is a front elevation view of an embodiment of a blade for the modular fan, shown in isolation.
Figure 3B:
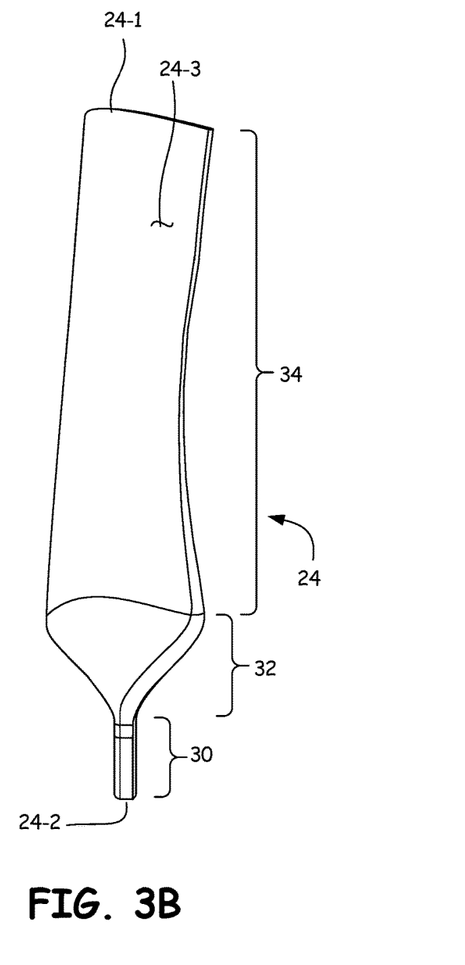
FIG. 3B is a side elevation view of the blade of FIG. 3A.

FIG. 3A is a front elevation view of an embodiment of a blade 24 for the fan 20, shown in isolation, and FIG. 3B is a side elevation view of the blade 24 of FIG. 3A. As discussed above, the blade 24 includes the tip 24-1, the root (or heel) end 24-2, the pressure side 24-3, the suction side 24-4 (not visible in FIGS. 3A and 3B), the leading edge 24-5 and the trailing edge 24-6. The blade 24 can be divided into distinct regions, including a mounting pad 30, a transition zone 32, and a working portion 34.

The mounting pad 30 can be located adjacent to or adjoining the root end 24-2, and can function to provide an attachment to the center hub assembly 26. In the illustrated embodiment, the mounting pad 30 has multiple openings 36 (e.g., five staged or staggered holes) through which fasteners can be positioned to facilitate engagement between the blade 24 and the center hub assembly 26. In some embodiments, the mounting pad 30 can be substantially planar (e.g., having opposite, parallel planar surfaces), to facilitate capture between planar first and second plates 26-1 and 26-2.

The working portion 34 adjoins the tip 24-1 of the blade 24, and provides primary working surfaces of an aerodynamic profile to interact with fluids when the blade 24 is in use. The particular shape of the working portion 34 can be configured to provide nearly any desired aerodynamic properties. For instance, parameters such as chord length, radial (i.e., spanwise) length L, thickness, twist, camber, sweep, lean, bow, dihedral, etc., can be adjusted as desired for particular applications. For instance, the working portion 24 (e.g., at the leading edge 24-5 and/or at the trailing edge 24-6) can be swept into or away-from a direction of rotation to help improve noise or efficiency characteristics of the fan 20, and a twist angle in the working portion 34 (which can be measured as an angle between a chord line extending between the leading and trailing edges 24-5 and 24-6 and a plane oriented orthogonal to the axis A) can vary in the radial (spanwise) direction.

The transition zone 32 extends between the mounting pad 30 and the working portion 34, and can provide a relatively high amount of twist so as to position the working portion 34 in a different and desired orientation relative to the mounting pad 30 and the center hub assembly 26. For instance, the transition zone 32 can be more twisted than the working portion 34 or the mounting pad 30, that is, the transition zone 32 can have a greater variation in twist angle than within either the working portion 34 or the mounting pad 30. In one embodiment, the working portion 34 has a twist angle that changes over a range of 5-20° (e.g., from approximately 30° adjacent to the transition zone 32 to 20° at the tip 24-1), the mounting pad 30 is untwisted (i.e., has no change in twist angle), and the transition zone 32 has a twist angle that changes over a range of more than 20° (e.g., by approximately 30°). As explained further below, the mounting pad 30 and the transition zone 32 can each be substantially thicker than the working portion 34, such that structural integrity and rigidity is provided at and near attachments to the center hub assembly 26, while providing desired aerodynamic and mass characteristics in the working portion 34. Some particularly advantageous thickness characteristics along the length L of the blade 24 are discussed below.

In some embodiments, the blade 24 can be made of a sheet molding compound (SMC) material, with or without reinforcement, filler(s) (e.g., hollow glass beads, abrasion-resistant materials, etc.), or other additives (e.g., for color, anti-static properties, etc.). Fillers and additives can be uniformly and homogeneously distributed throughout the blade 24 and the SMC material, or can be localized is selected areas. For instance, a thermoset SMC material of a vinyl ester resin having chopped fiberglass reinforcement can be used. In contrast to continuous fiber composite materials, chopped reinforcement fibers used with composite materials have short, discontinuous fibers that are arranged essentially randomly within a binder matrix. The chopped reinforcement fibers can be essentially uniformly distributed throughout the SMC material, although further embodiments with additional reinforcement are discussed below. The chopped reinforcement fibers can be 30-55% (by weight) of the overall SMC material, and more preferably 34-50% (by weight) and most preferably approximately 47% (by weight). However, the particular materials used and the percentage of reinforcement fibers can vary as desired for particular applications.

Figure 4:
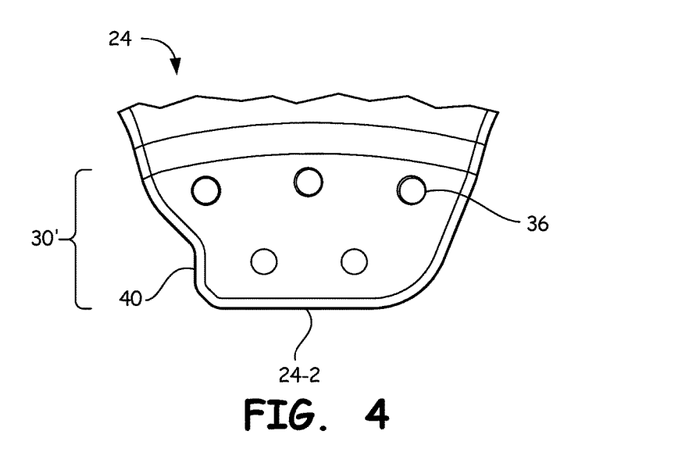
FIG. 4 is a front elevation view of a portion of an alternate embodiment of a blade.

FIG. 4 is a front elevation view of a portion of an alternate embodiment of the blade 24, having a differently configured mounting pad 30'. As shown in the embodiment of FIG. 4, a notch 40 is provided along a lateral edge of the mounting pad 30' as an alignment feature for quality measurements. The notch 40 can extend to the root end 24-2. The presence of the notch 40 is not specifically related to aerodynamic or structural design of the blade 24, but is beneficial for manufacturability and dimensional verification and control.

Figure 5:
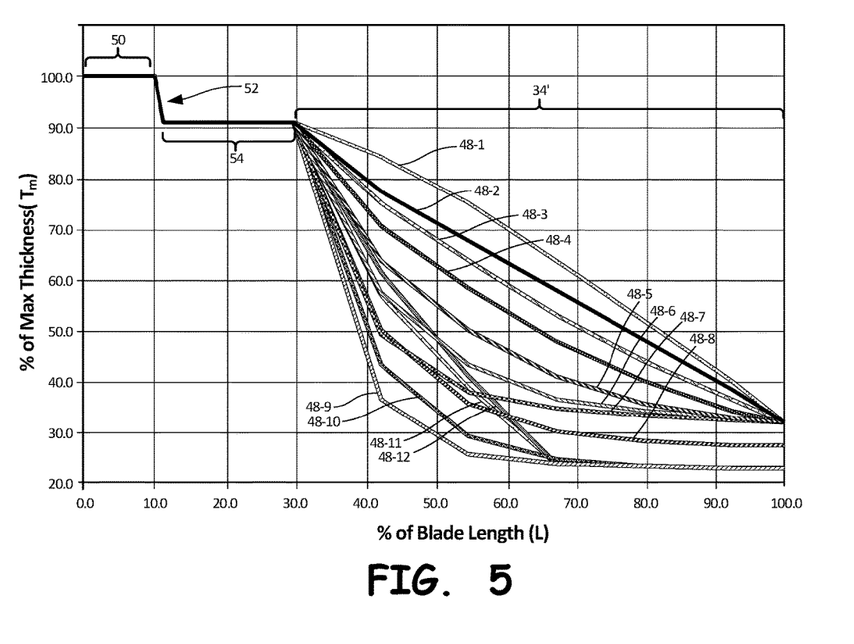
FIG. 5 is a graph of thickness at a radial plane extending from a fan axis, as a percentage of maximum thickness, vs. radial position, as a percentage of blade length, for embodiments of a blade.

FIG. 5 is a graph of a thickness profile at a radial plane extending from the fan axis A (which corresponds to the section line 2-2 of FIG. 1), as a percentage of the maximum thickness $T_M$, vs. radial position, as a percentage of the overall blade length L, for a number of embodiments of a blade 24. Each illustrated embodiment (eleven in total) is represented in the graph of FIG. 5 by a corresponding plot line 48-1 to 48-12. As shown in FIG. 5, 0% of the blade length L corresponds to the root end 24-2 and 100% of the blade length L corresponds to the tip 24-1. The actual dimensions corresponding to the maximum thickness $T_M$ and the blade length L can vary as desired for particular applications. In one example embodiment, the maximum thickness $T_M$ can be 11 mm (0.433 in.) and the blade length L can be 400 mm (15.748 in.).

In the illustrated embodiments, the blade thickness can have a first region 50, a narrowing transition region 52, a second region 54, and an additional region 34' corresponding to the working portion 34 (referred to herein simply as the working portion region 34'). The working portion region 34' can extend to 100% of the blade length L (i.e., to the tip 24-1). In the illustrated embodiments, the working portion region 34 begins at 30% of the blade length L and ends at 100% of the blade length L, meaning that the working portion 34 encompasses 70% of the blade length L. The first region 50 can begin at 0% of the blade length L (i.e., at the root end 24-2). In the illustrated embodiments, the first region 50 ends at 10% of the blade length L, meaning that the first region 50 encompasses 10% of the blade length L. The narrowing transition region 52 is located in between the first and second regions 50 and 54, and can connect those first and second regions 50 and 54. In the illustrated embodiments, the narrowing transition region 52 begins at 10% of the blade length L and ends at 11.5% of the blade length L, meaning that the narrowing transition region 52 encompasses 1.5% of the blade length L. The second region 54 can adjoin the working portion region 34'. In the illustrated embodiments, the second region 54 begins at 11.5% of the blade length L and ends at 30% of the blade length L, meaning that the second region 54 encompasses 18.5% of the blade length L. The first and second regions 50 and 54 each have a constant (i.e., uniform) or substantially constant thickness in the illustrated embodiments. The maximum thickness $T_M$ along the blade length L can be located at the first region 50, that is, the first region 50 can have a value of 100% $T_M$. The second region 54 has a lesser thickness than the first region 50 (e.g., approximately 91% $T_M$). Each of the illustrated plots 48-1 to 48-12 has a minimum thickness value at 100% of the blade length L (i.e., at the tip 24-1). The thickness in the narrowing transition region 52 can decrease linearly or substantially linearly, or can decrease in other ways, such as with an increasing or decreasing rate of change as a function of the blade length L.

The first region 50 can correspond to the mounting pad 30, while the narrowing transition region 52 can fall within the transition zone 32. In further embodiments, one or more additional narrowing transition regions (not shown in FIG. 5) can be provided within the transition zone 32, such that a step-wise narrowing of thickness occurs. In still further embodiments, the second region 54 can have a non-uniform thickness, such as to provide a slight and gradual change in thickness at a rate much less than the rate of change in the narrowing transition region 52.

The narrowing transition region 52 can be positioned along the blade length L such that a portion of the transition zone 32 that is thinner than the mounting pad 30 is located between the first and second plates 26-1 and 26-2. As best shown in FIG. 2B, the blade 24 can be secured to the center hub assembly 26 such that the transition zone 32 begins radially inward from outer diameter edges 26-3 of the first and second plates 26-1 and 26-2 of the center hub assembly 26. The decrease in thickness of the blade 24 produced by the narrowing transition region 52 can create a gap 60 between the blade 24 and the center hub assembly 26 at one or both sides of the blade 24 at the transition zone 32. In other words, the smaller thickness of the blade 24 proximate at least one of the outer diameter edges 26-3 of the first and second plates 26-1 and 26-2 compared to the thickness at the mounting pad 30 produces one of more of the gaps 60. In the illustrated embodiment of FIG. 2B, there are two substantially equal gaps 60 present, one adjoining the first plate 26-1 and the other adjoining the second plate 26-2 on the opposite side of the blade 24. Having one or more gaps 60 at or near the outer diameter edges 26-3 of the center hub assembly 26 helps to reduce stress concentrations at an interface between a given blade 24 and the center hub assembly 26. Such reduction of stress concentration can facilitate the use of smaller values of the maximum thickness $T_M$ of the blades 24, thereby reducing mass of the fan 20, and can help avoid the need for continuous strand reinforcement filaments, complexly shaped reinforcement material preforms, or other more complex and expensive manufacturing techniques, where the blades 24 are made of composite materials.

Turning again to FIG. 5, although the illustrated embodiments all have a common profile in the regions 50, 52 and 54, that is, the plot lines 48-1 to 48-12 are coincident in the regions 50, 52 and 54, the thickness in the working portion region 34' varies between the embodiments illustrated by the plot lines 48-1 to 48-12 in FIG. 5. In general, all of the illustrated embodiments have decreasing thickness toward 100% of the blade length L (i.e., toward the tip 24-1) in the working portion region 34'. Various illustrated embodiments (e.g., the plot line 48-2) have substantially linearly decreasing profiles. The embodiments represented by the plot lines 48-1 to 48-7 each decrease from 90.9% $T_M$ to 31.8% $T_M$ at 100% of the blade length L. The embodiment represented by the plot line 48-8 instead decreases from 90.9% $T_M$ to 27.3% $T_M$ at 100% of the blade length L. Further, the embodiments represented by the plot lines 48-9 to 48-12 each decrease from 90.9% $T_M$ to 22.7% $T_M$ at 100% of the blade length L. The embodiments represented by the plot lines 48-9 to 48-12 also generally decrease in thickness relatively rapidly to a point (e.g., at approximately 42% of the blade length L), and then either decrease in thickness relatively slowly or maintain a substantially constant thickness to 100% of the blade length L. For example, in the plot lines 48-11 and 48-12 both decrease the thickness by 67.3% of $T_M$ over 37.5% of the blade length L in an inner part of the working portion region 34', at a substantially linear or decreasing rate of change, and then decrease the thickness by only 0.9% $T_M$ over the remaining 32.5% of the blade length L to 100% of the blade length L (i.e., to the tip 24-1). The plot lines 48-9 to 48-12 each have a uniform thickness over an outermost portion to 100% of the blade length L, such as over the outermost 7.5% of the blade length L. The thickness reduction in the working portion region 34' can be optimized for various performance parameters. For instance, the thickness profiles of the working portion region 34' discussed above can help reduce stress concentrations at the leading and trailing edges 24-5 and 24-6 outward of the transition zone 32 of the airfoil 24, while having a negligible impact on max burst speed capability.

It should be noted that the embodiments illustrated in FIG. 5 and described above are provided merely by way of example and not limitation. Workers skill in the art will recognize that other embodiments are possible in accordance with the present invention.

Figure 6:
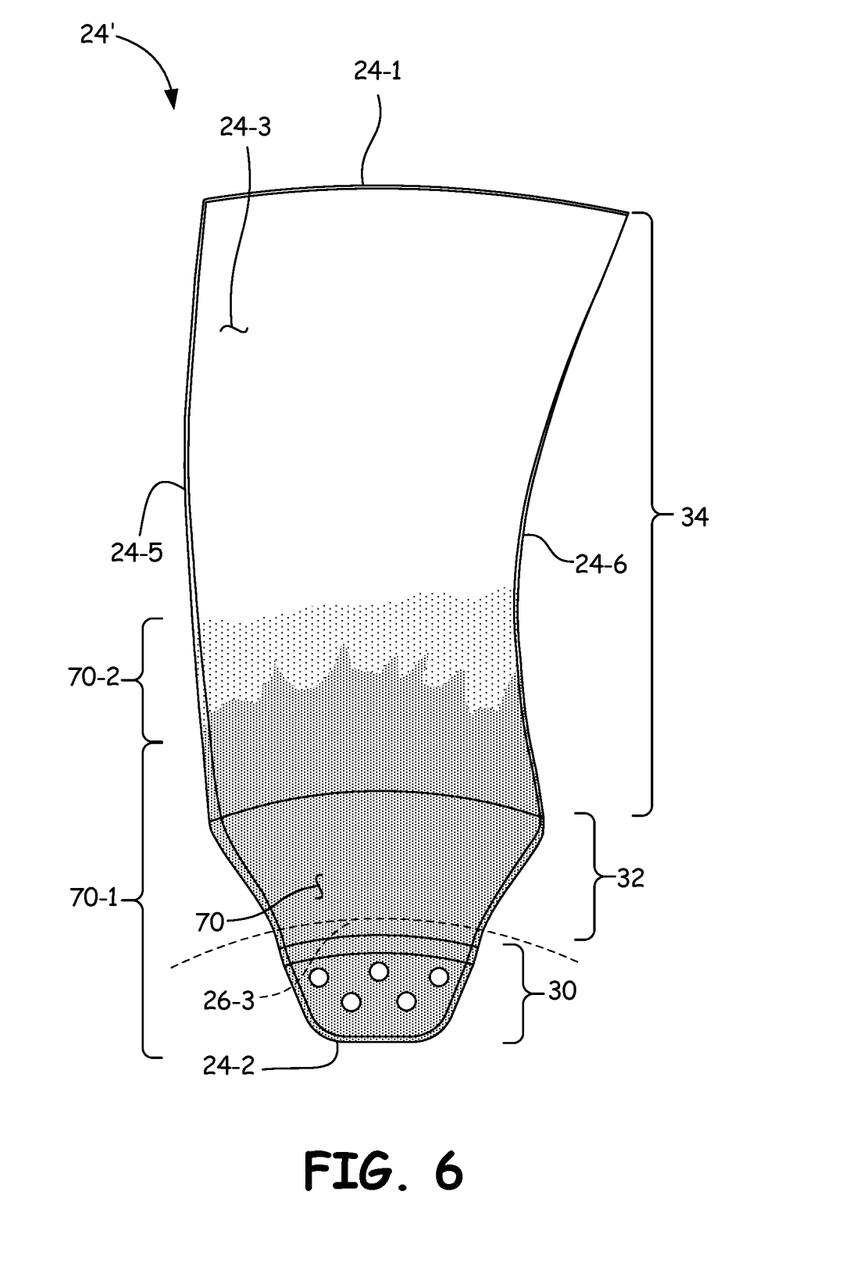
FIG. 6 is a front elevation view of another embodiment of a reinforced fan blade according to the present invention.
Figure 7:
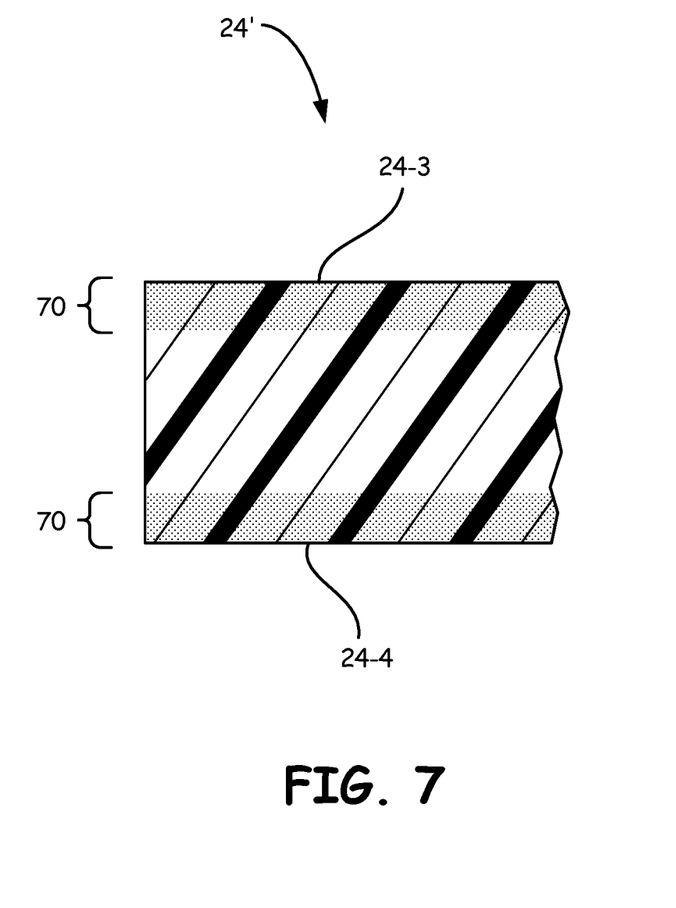
FIG. 7 is a cross-sectional view of a portion of the reinforced fan blade of FIG. 6.

FIG. 6 is a front elevation view of an embodiment of a reinforced blade 24', and FIG. 7 is a cross-sectional view of a portion of the reinforced blade 24'. The blade 24' can be utilized with the fan 20, and can have a configuration similar to the embodiments of the blade 24 described above or another configuration, as desired. The blade 24' includes reinforcement that can help improve durability and strength.

The blade 24' can be made of a sheet molding compound (SMC) material, such as a thermoset SMC material having chopped fiberglass reinforcement within a binder matrix (e.g., vinyl ester), with additional reinforcement provided at one or more selected regions. For instance, a reinforcement mat 70 can be incorporated into the mounting pad 30, the transition zone 32 and/or the working portion 34 of the blade 24' that provides a localized reinforcement skin with additional reinforcement fibers monolithically joined to a remainder of the blade 24'. The skin provided by the reinforcement mat 70 can be localized at or near external surfaces of the blade 24' (e.g., the pressure and suction sides 24-3 and 24-4), as shown in FIG. 7. It should be noted that individual reinforcement fibers are not shown in FIGS. 6 and 7, but instead the reinforcement mat 70 is depicted schematically by stippling.

In some embodiments, the reinforcement mat 70 can be incorporated into the blade 24' without any overall change in thickness relative to the non-reinforced blade 24 described above. In other embodiments, the reinforcement mat 70 can help provide a thickened region at or near the root end 24-2. The reinforcement mat 70 can extend from the root end 24-2 through the mounting pad 30 and into (or through) the transition zone 32, and optionally also into the working portion 34. In this way, relative to the thickness profile embodiments described above, the reinforcement mat 70 can extend entirely through the narrowing transition region 52 of the transition zone 32, and also entirely through the second region 54. In that way, when the blade 24' is used in the fan assembly 20, the reinforcement mat can extend outward beyond the outer edge 26-3 of the first and/or second plates 26-1 and 26-2 (illustrated by a dashed reference arc in FIG. 6). In some embodiments, the reinforcement mat 70 can provide a first region 70-1 and a second region 70-2. The first region 70-1 can be located at or near the root end 24-2 and can extend outward along the length of the blade 24' through the mounting pad 30 and the transition zone 32 and into the working portion 34. In the first region 70-1 the mat 70 can provide relatively more dense reinforcement. The reinforcement mat 70 can have some areas of limited or interrupted coverage in the first region 70-1 and/or the second region 70-2 due to material flow during fabrication, which is discussed further below, though uniform and homogeneous coverage in at least the first region 70-1 may be advantageous in some embodiments. In the second region 70-2 the mat 70 can be feathered or blended into base or parent material of the blade 24', such as in a gradient that diminishes the reinforcement in an outward direction. The gradient of the second region 70-2 thereby blends the reinforcement mat 70 smoothly into parent material of the blade 24'. The second region 70-2 can be located at an outward extent of the mat 70, and can be positioned in the working portion 34 (e.g., near a base or root end of the airfoil working portion). The use of particular embodiments of compression molding techniques, which are explained below, can facilitate creating a reinforcement skin with the reinforcement mat 70 in the first and second regions 70-1 and 70-2.

The reinforcement mat 70 can be made from material comparable to that of the base material of the blade 24', such as chopped fiberglass reinforced SMC material. Alternatively, the reinforcement mat can be made from material that differs from the parent material, such as being in the form of a woven mat (i.e., continuous strand filaments in a woven pattern), having directionally-oriented (i.e., non-random) chopped reinforcement fibers, having a higher percentage of reinforcement fibers than the parent material, and the like.

The reinforcement mat 70 helps provide improved strength and durability to the blade 24' for use with the fan 20, particularly with respect to relatively high stress regions at or near the center hub assembly 26. Such improved strength and durability allows for higher speed operation (i.e., faster rotational speeds) than would otherwise be possible. The inventors have discovered through experimental testing that an approximately 118% increase in speed capability of the fan 20 is possible through the use of the reinforcement mat 70 with the blade 24'.

Figure 8:
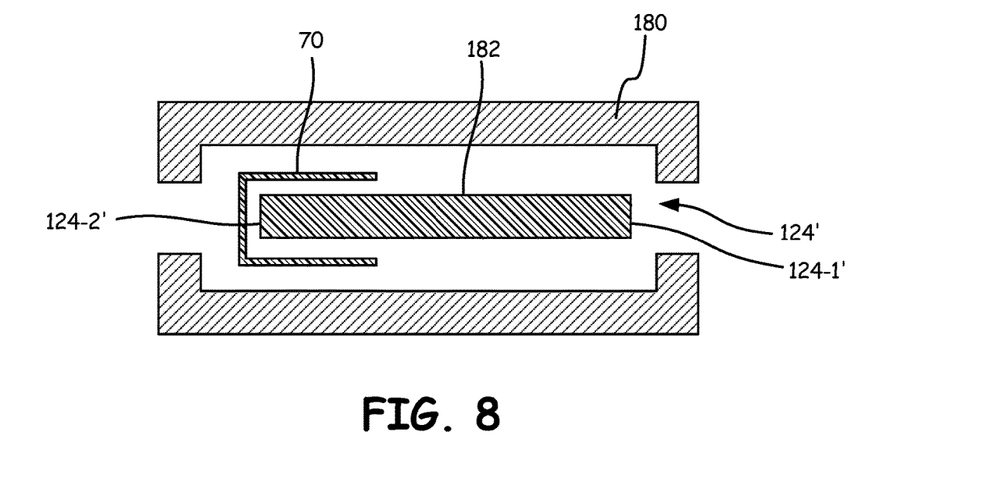
FIG. 8 is a schematic view of a blade workpiece assembly and a die assembly according to the present invention.

FIG. 8 is a schematic view of a blade workpiece assembly 124' and a die assembly 180 suitable for making the reinforced blade 24'. An embodiment of a fabrication process for making the reinforced blade 24' is as follows. First, SMC sheet stock material (e.g., uncured thermoset sheet material) is rough cut to a desired size to make a "charge cut" blank 182, which has a tip 124-1' and an opposite root or heel 124-2'. The charge cut blank 182 can correspond to a blank that could, alternatively, be used to make the blade 24, and represents the parent material of the finished reinforced blade 24'. In typical embodiments, the blank 182 is shaped as a strip or other simple shape. In this sense complex preparatory cutting and shaping is unnecessary. The reinforcement mat 70 is also rough cut to a desired size from SMC sheet stock material, and can be wrapped around the root 124-2' of the blank 182. In the illustrated embodiment only a single layer reinforcement mat 70 is used, though in further embodiments multiple layers can be utilized. The reinforcement mat 70 can be sized to extend a desired distance toward the tip 124-1' when wrapped around the blank 182. A cut length of the reinforcement mat 70 prior to compression molding can be adjusted to determine how far through the transition zone 32 and into the working portion 34 of the blade 24' the reinforcement mat 70 extends when finished. In the illustrated embodiment, the reinforcement mat 70 extends symmetrically along opposite sides of the blank 182, but in alternate embodiments an asymmetric arrangement can be used instead. Together the blank 182 and the reinforcement mat 70 make up the workpiece assembly 124'.

The workpiece assembly 124', with the reinforcement mat 70 positioned in a desired orientation relative to the blank 182, can be inserted into the die assembly 180. In this way both the blank 182 (i.e., the parent material) and the reinforcement mat 70 are both present within the die assembly 180 at the same time. Optionally, additives and/or other materials can also be positioned in the die assembly 180 with the reinforcement mat 70 and the blank 182. For instance, glass beads can be placed in the die assembly 180 along at least one selected portion of the blank 182, such that a syntactic material is produced along at least a portion of the blade 24'. The glass beads could be present in an additional SMC strip, or loose.

Compression molding can then be performed with the die assembly 180 by applying suitable heat and pressure to the workpiece assembly 124'. The die assembly 180 modifies the shape of the workpiece assembly 124' to produce a properly shaped blade 24'. The heat and pressure of the compression molding process can "set" the thermoset SMC material, if such material is used, in a manner well-known to those of ordinary skill in that art. After compression molding, trim operations can be performed to remove flash. Further, as mentioned above, additional trimming operations can optionally be performed to shorten the blade 24' to a desired length. It should be noted that the blade 24 can be made in a similar fashion, simply by omitting the reinforcement mat 70 and related steps.

The fabrication process described above allows for relatively efficient and economical manufacture of the blade 24', without the need for complex dies or more elaborate molding processes (e.g., without the need for complex continuous strand composite molding techniques or preforms), while still producing a strong and durable blade of lightweight composite material suitable for automotive and vocational fan applications. Moreover, the fabrication process described above accommodates some variability in reinforcement fiber orientation due to material flow during compression molding while still providing a strong and durable finished blade 24' and fan 20.

Discussion of Possible Embodiments

The following are non-exclusive descriptions of possible embodiments of the present invention.

A modular fan assembly including: a center hub assembly that includes a first plate having an outer edge, and a second plate having an outer edge; and a first blade attached to the center hub assembly, the first blade having a mounting pad and a working portion, wherein the mounting pad is positioned in between the first plate and the second plate, wherein the working portion extends beyond the outer edges of the first and second plates of the center hub assembly, and wherein a thickness of the first blade is smaller proximate the outer edge of the first plate than at the mounting pad to create a first gap between the first blade and the first plate at the outer edge of the first plate.

The modular fan assembly of the preceding paragraph can optionally include, additionally and/or alternatively, any one or more of the following features, configurations and/or additional components:

a plurality of additional blades, wherein the plurality of additional blades are each configured substantially identically to the first blade;

the mounting pad can have a planar configuration and a uniform thickness;

a second gap between the first blade and the second plate at the outer edge of the second plate;

the first and second gaps can be substantially equal;

the first blade can have a thickness profile from a root end to a tip, and the thickness profile can have a maximum thickness at the mounting pad;

the thickness profile can have a minimum value at the tip, the tip being part of the working portion;

the first blade can have a thickness profile that includes a first region, a narrowing transition region, a second region and a further region corresponding to the working portion, wherein the first region has a uniform thickness and corresponds to the mounting pad, wherein the narrowing transition region and the second region are part of a transition zone between the mounting pad and the working portion, wherein the smaller thickness of the first blade proximate the outer edge of the first plate is provided by at least one of the narrowing transition region and the second region;

the first blade can have a thickness profile from a root end to a tip, the thickness profile having a step-wise narrowing between two regions of uniform thickness, the two regions of uniform thickness located radially inward from the working portion, and one of the regions of uniform thickness encompasses the mounting pad;

a thickness in the working portion can decrease toward the tip;

a rate of change of the thickness in the working portion can decrease non-linearly toward the tip;

a rate of change of the thickness in the working portion can decrease at a declining rate toward the tip;

the working portion can include a substantially constant thickness region at the tip;

the first blade can be made of a composite material, and preferably the blade is made of short-strand fiber reinforced thermoset material;

a reinforcement skin localized about a root end of the first blade, wherein the reinforcement skin extends through the mounting pad and into the working portion;

the reinforcement skin can comprise a reinforcement mat of short-strand fibers;

the reinforcement skin can include a gradient region along the working portion of the first blade;

the first blade can be configured to produce an axial or generally axial fluid flow during operation;

the mounting pad can include a plurality of fastener openings; and/or the working portion can be thinner than both the mounting pad and the transition zone.

A blade for am axial or generally axial flow fan can include: a tip; a root end opposite the tip, wherein a blade length is defined between the root end and the tip; a mounting pad located adjacent to the root end, wherein the mounting pad has a first thickness that is substantially uniform; a working portion adjoining the tip, wherein the working portion defines an aerodynamic profile; and a transition zone between the mounting pad and the working portion, wherein the transition zone includes a narrowing transition region and a region with a second thickness that is substantially uniform, the second thickness being less than the first thickness.

The blade of the preceding paragraph can optionally include, additionally and/or alternatively, any one or more of the following features, configurations and/or additional components:

the transition zone can be twisted;

the transition zone can be more twisted than the working portion;

the working portion can be thinner than both the mounting pad and the transition zone;

the first thickness can constitute a maximum thickness between the root end and the tip;

a thickness in the working portion can decrease toward the tip, and a minimum thickness between the root end and the tip can be located at the tip;

a rate of change of the thickness in the working portion can decrease non-linearly toward the tip;

a rate of change of the thickness in the working portion can decrease at a declining rate toward the tip;

the thickness in the working portion can include a substantially constant thickness region at the tip;

the working portion of the blade can be swept into or away-from the direction of rotation to improve fan noise or efficiency characteristics; the first blade can be made of a reinforced composite material, preferably short-strand fiber reinforced thermoset material;

a reinforcement skin localized about the root end, the reinforcement skin extending through the mounting pad and the transition zone and into the working portion.

the reinforcement skin can comprise a reinforcement mat of short-strand fibers the reinforcement skin can include a gradient region along the working portion of the first blade;

the mounting pad can include a plurality of fastener openings; and/or the plurality of fastener openings can be staggered.

A method of making a modular fan can include: positioning a mounting pad of a blade between two plates of a center hub assembly; aligning the blade such that the mounting pad is located radially inward of an outer edge of at least one of the two plates; and spacing the outer edge of the at least one of the two plates from the blade at the outer edge.

The method of the preceding paragraph can optionally include, additionally and/or alternatively, any one or more of the following steps and/or aspects:

attaching a fastener to the two plates and the blade, wherein the fastener passes through an opening in the mounting pad;

molding a reinforcement mat into the blade at the mounting pad; and/or wrapping a reinforcement mat made of a sheet of reinforced thermoset material about a blank made of a reinforced thermoset material, such that the reinforcement mat extends only partially along a length of the blank; and compressing the reinforcement mat and the blank in a die.

A modular fan can include: a center hub assembly comprising: a first plate having an outer edge; and a second plate having an outer edge; and a first blade made of a composite material and attached to the center hub assembly, the first blade comprising: a tip; a root end opposite the tip, wherein a blade length is defined between the root end and the tip; and a reinforcement skin localized about the root end along the blade length, wherein the reinforcement skin extends past the outer edge of the first plate of the center hub assembly.

The modular fan of the preceding paragraph can optionally include, additionally and/or alternatively, any one or more of the following features, configurations and/or additional components:

the reinforcement skin can extend past the outer edge of the second plate of the center hub assembly;

the reinforcement skin extends substantially equally along the blade length on opposite sides of the first blade;

the reinforcement skin can comprise a reinforcement mat of short-strand fibers;

the reinforcement skin can include a gradient region;

the first blade can be configured to produce an axial or generally axial fluid flow during operation;

the first blade further comprises:

a mounting pad located adjacent to the root end;

a working portion adjoining the tip, wherein the working portion defines an aerodynamic profile;

a transition zone between the mounting pad and the working portion, wherein the reinforcement skin extends through the mounting pad and the transition zone and into the working portion;

the working portion can be thinner than both the mounting pad and the transition zone;

a maximum thickness between the root end and the tip can be located at the mounting pad;

a thickness in the working portion can decrease toward the tip, such that a minimum thickness between the root end and the tip is located at the tip;

the mounting pad can include a plurality of fastener openings.

the transition zone can be more twisted than the mounting pad and the working portion;

the first blade can be made of short-strand fiber reinforced thermoset material;

a plurality of additional blades, wherein the plurality of additional blades are each configured substantially identically to the first blade;

a thickness of the first blade can be smaller proximate the outer edge of the first plate than adjacent to the root end to create a first gap between the first blade and the first plate at the outer edge of the first plate; and/or a second gap between the first blade and the second plate at the outer edge of the second plate.

A composite blade for an axial or generally axial flow fan can include: a tip; a root end opposite the tip, wherein a blade length is defined between the root end and the tip; a mounting pad located adjacent to the root end; a working portion adjoining the tip, wherein the working portion defines an aerodynamic profile; a transition zone between the mounting pad and the working portion; and a reinforcement skin localized about the root end along the blade length, wherein the reinforcement skin extends through the mounting pad and the transition zone and into the working portion.

The composite blade of the preceding paragraph can optionally include, additionally and/or alternatively, any one or more of the following features, configurations and/or additional components:

the mounting pad can have a first thickness that is substantially uniform, wherein the transition zone includes a narrowing transition region and a region with a second thickness that is substantially uniform, the second thickness being less than the first thickness;

the reinforcement skin can extend entirely through the narrowing transition region of the transition zone;

the reinforcement skin can comprise a reinforcement mat of short-strand fibers;

the reinforcement skin can include a gradient region;

the working portion can be thinner than both the mounting pad and the transition zone;

a maximum thickness between the root end and the tip can be located at the mounting pad;

a thickness in the working portion can decrease toward the tip, and a minimum thickness between the root end and the tip can be located at the tip;

the mounting pad can include a plurality of fastener openings;

the transition zone can be more twisted than the mounting pad and the working portion; and/or the blade can be made of short-strand fiber reinforced thermoset material.

A method of making a composite fan blade can include: wrapping a reinforcement mat about an end of a blank made of composite material, such that the reinforcement mat extends only partially along a length of the blank; and compressing the reinforcement mat and the blank in a die.

The method of the preceding paragraph can optionally include, additionally and/or alternatively, any one or more of the following steps and/or aspects:

cutting the blank from thermoset sheet molding compound sheet stock;

a method of making a fan with the fan blade described above can include: positioning a mounting pad of the composite fan blade between two plates of a center hub assembly; aligning the composite fan blade such that the mounting pad is located radially inward of an outer edge of at least one of the two plates; and spacing the outer edge of the at least one of the two plates from the composite fan blade at the outer edge;

attaching a fastener to the two plates and the blade, wherein the fastener passes through an opening in the mounting pad;

dispersing material of the reinforcement mat in a gradient into parent material of the blank; and/or incorporating glass beads into at least a portion of the blank.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For instance, features of any embodiment disclosed above can be utilized in combination with features from any other embodiment disclosed above.

The invention claimed is:

1. A modular fan comprising:
    a center hub assembly comprising:
        a first plate having an outer edge; and
        a second plate having an outer edge; and
    a first blade made of a randomly oriented short-strand fiber reinforced thermoset composite material and attached to the center hub assembly, the first blade comprising:
        a tip;
        a root end opposite the tip, wherein a blade length is defined between the root end and the tip;
        a mounting pad located adjacent to the root end;
        a working portion adjoining the tip, wherein the working portion defines an aerodynamic profile;
        a transition zone between the mounting pad and the working portion, wherein the transition zone is more twisted than the mounting pad and the working portion; and
        a reinforcement skin localized around an outside of the root end along the blade length, wherein the reinforcement skin extends past the outer edge of the first plate of the center hub assembly, wherein the reinforcement skin extends through the mounting pad and the transition zone and into the working portion, and wherein the reinforcement skin comprises a reinforcement mat with randomly oriented short-strand fibers.

2. The modular fan of claim 1, wherein the reinforcement skin extends past the outer edge of the second plate of the center hub assembly.

3. The modular fan of claim 1, wherein the reinforcement skin extends substantially equally along the blade length on opposite sides of the first blade.

4. The modular fan of claim 1, wherein the reinforcement skin includes a gradient region.

5. The modular fan of claim 4, wherein the gradient region is feathered to provide interrupted coverage.

6. The modular fan of claim 1, wherein the first blade is configured to produce an axial fluid flow during operation.

7. The modular fan of claim 1, wherein the working portion is thinner than both the mounting pad and the transition zone.

8. The modular fan of claim 1, wherein a maximum thickness between the root end and the tip is located at the mounting pad.

9. The modular fan of claim 1, wherein a thickness in the working portion decreases toward the tip, and wherein a minimum thickness between the root end and the tip is located at the tip.

10. The modular fan of claim 1, wherein the mounting pad includes a plurality of fastener openings.

11. The modular fan of claim 1 and further comprising:
a plurality of additional blades, wherein the plurality of additional blades are each configured substantially identically to the first blade.

12. A composite blade for an axial flow fan, the blade comprising:
a tip;
a root end opposite the tip, wherein a blade length is defined between the root end and the tip;
a mounting pad located at the root end, the mounting pad having a substantially planar configuration;
a working portion adjoining the tip, wherein the working portion defines an aerodynamic profile;
a transition zone between the mounting pad and the working portion, wherein the transition zone is more twisted than the mounting pad and the working portion; and
a reinforcement skin localized around an outside of the root end along the blade length, wherein the reinforcement skin extends through the mounting pad and the transition zone and partially into the working portion.

13. The composite blade of claim 12, wherein the mounting pad has a first thickness that is substantially uniform, wherein the transition zone includes a narrowing transition region and a region with a second thickness that is substantially uniform, the second thickness being less than the first thickness.

14. The composite blade of claim 13, wherein the reinforcement skin extends entirely through the narrowing transition region of the transition zone.

15. The composite blade of claim 12, wherein the reinforcement skin comprises a reinforcement mat of randomly oriented short-strand fibers.

16. The composite blade of claim 12, wherein the reinforcement skin includes a gradient region having interrupted coverage exhibiting feathering.

17. The composite blade of claim 12, wherein the working portion is thinner than both the mounting pad and the transition zone.

18. The composite blade of claim 12, wherein a maximum thickness between the root end and the tip is located at the mounting pad.

19. The composite blade of claim 12, wherein a thickness in the working portion decreases toward the tip, and wherein a minimum thickness between the root end and the tip is located at the tip.

20. The composite blade of claim 12, wherein the mounting pad includes a plurality of fastener openings.

21. The composite blade of claim 12, wherein the blade is made of randomly oriented short-strand fiber reinforced thermoset material.

22. A method of making a composite fan blade, the method comprising:
wrapping a reinforcement mat about a root end of a blank consisting essentially of fiber reinforced thermoset composite material, such that the reinforcement mat extends partially along a length of the blank;
compressing the reinforcement mat and the blank in a die;
dispersing material of the reinforcement mat in a gradient into parent material of the blank; and
forming a localized reinforcement skin with the reinforcement mat as a function of the step of compressing the reinforcement mat and the blank in the die, wherein the reinforcement skin extends across opposite surfaces of a root end of the composite fan blade and partially along a working portion of the composite fan blade.

23. The method of claim 22 and further comprising:
cutting the blank from thermoset sheet molding compound sheet stock.

24. The method of making a fan with the composite fan blade of claim 22, the method further comprising:
positioning a mounting pad of the composite fan blade between two plates of a center hub assembly;
aligning the composite fan blade such that the mounting pad is located radially inward of an outer edge of at least one of the two plates and such that the reinforcement skin extends past the outer edge of the at least one of the two plates; and
spacing the outer edge of the at least one of the two plates from the composite fan blade.

25. The method of claim 24 and further comprising:
attaching a fastener to the two plates and the blade, wherein the fastener passes through an opening in the mounting pad and the reinforcement skin.

26. The method of claim 22 and further comprising:
incorporating glass beads into at least a portion of the blank.

* * * * *